(12) United States Patent
Jacob et al.

(10) Patent No.: US 9,416,265 B2
(45) Date of Patent: Aug. 16, 2016

(54) METHODS OF FORMING COMPOSITIONS AND ARTICLES

(71) Applicants: Sunny Jacob, Seabrook, TX (US);
Michael J. Goncy, Kent, OH (US);
Peter D. Hartwell, Hinckley, OH (US);
Bruce R. Lundmark, Akron, OH (US)

(72) Inventors: Sunny Jacob, Seabrook, TX (US);
Michael J. Goncy, Kent, OH (US);
Peter D. Hartwell, Hinckley, OH (US);
Bruce R. Lundmark, Akron, OH (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 572 days.

(21) Appl. No.: 13/691,252

(22) Filed: Nov. 30, 2012

(65) Prior Publication Data
US 2014/0155513 A1    Jun. 5, 2014

(51) Int. Cl.
| | |
|---|---|
| C08L 23/12 | (2006.01) |
| C08L 23/16 | (2006.01) |
| C08F 255/02 | (2006.01) |
| C08F 255/06 | (2006.01) |
| C08K 5/103 | (2006.01) |
| C08K 5/526 | (2006.01) |
| C08K 5/00 | (2006.01) |
| C08K 5/3492 | (2006.01) |

(52) U.S. Cl.
CPC .............. C08L 23/16 (2013.01); C08F 255/02 (2013.01); C08F 255/06 (2013.01); *C08K 5/0025* (2013.01); *C08K 5/103* (2013.01); *C08K 5/34924* (2013.01); *C08K 5/526* (2013.01)

(58) Field of Classification Search
CPC ........ C08F 8/14; C08F 255/02; C08F 255/06; C08L 23/12; C08L 23/16
See application file for complete search history.

(56) References Cited

U.S. PATENT DOCUMENTS

| | | | |
|---|---|---|---|
| 6,342,565 B1 | 1/2002 | Cheng et al. | |
| 6,525,157 B2 | 2/2003 | Cozewith et al. | |
| 7,867,433 B2 | 1/2011 | Jacob et al. | |
| 8,013,069 B2 | 9/2011 | Harrington et al. | |
| 8,178,031 B2 | 5/2012 | Jacob et al. | |
| 8,247,494 B2 | 8/2012 | Blok et al. | |
| 2007/0167553 A1 | 7/2007 | Westwood et al. | |
| 2011/0118400 A1* | 5/2011 | Neuteboom | 524/400 |
| 2012/0077898 A1 | 3/2012 | Jacob | |
| 2012/0202915 A1 | 8/2012 | Jacob et al. | |
| 2012/0220682 A1 | 8/2012 | Jacob | |

FOREIGN PATENT DOCUMENTS

WO    WO 2011/041230    4/2011

OTHER PUBLICATIONS

U.S. Appl. No. 13/532,276, filed Jun. 25, 2012, Jacob.

* cited by examiner

*Primary Examiner* — Peter D Mulcahy
(74) *Attorney, Agent, or Firm* — Priya G. Prasad

(57) ABSTRACT

A method for forming a composition comprising a propylene-based polymer and a co-agent is provided. The method comprises introducing a propylene-based polymer to an extruder and introducing the co-agent to the extruder at a position within the extruder where the temperature is from 23° C. to 125° C.

23 Claims, No Drawings

METHODS OF FORMING COMPOSITIONS AND ARTICLES

FIELD OF THE INVENTION

The present invention relates to a method for making a composition comprising a propylene-based polymer and a co-agent, a composition made by the method, and a method of making an article comprising the composition.

BACKGROUND OF THE INVENTION

Materials with good stretchability and elasticity are used to manufacture a variety of disposable articles in addition to durable articles including incontinence pads, disposable diapers, training pants, clothing, undergarments, sports apparel, automotive trim, weather-stripping, gaskets, and furniture upholstery. For clothing, stretchability and elasticity are performance attributes that allow the materials to provide a closely conforming fit to the body of the wearer.

Propylene-based polymers having good elastic properties are known and have been used for stretchable clothing. See, for example, U.S. Pat. Nos. 6,525,157 and 6,342,565.

U.S. Pat. Nos. 8,178,031 and 7,867,433 disclose methods for making crosslinked elastomeric compositions and articles made from the elastomeric compositions. The elastomeric composition comprising at least one propylene-based polymer is blended with at least one component selected from multifunctional acrylates, multifunctional methacrylates, functionalized polybutadiene resins, functionalized cyanurate, and allyl isocyanurate; and blended with at least one component selected from hindered phenols, phosphites, and hindered amines. The propylene-based polymer may include propylene derived units and one or more dienes, and have a triad tacticity of from 50% to 99% and a heat of fusion of less than 80 J/g. The blended composition may then be extruded and crosslinked. The extruded polymer may be crosslinked using electron beam radiation having an e-beam dose of 100 KGy or less. The crosslinked polymers are particularly useful for making fibers and films.

PCT Publication WO 2011/041230 discloses crosslinked polyolefin blends, methods for their production, and articles made of the same. The polyolefin blends comprise a first polymer formed in a first reactor and a second polymer formed in a second reactor. The first and second polymers, as well as the resulting blend, may comprise units derived from propylene, ethylene, and a diene. The blended composition may then be compounded with one or more co-agents, antioxidants, and/or other additives and crosslinked, preferably by exposure to energetic photons. The crosslinked polymers are particularly useful for making fibers, films, and nonwovens.

U.S. Patent Application Publication No. 2012/0220682 discloses a method for making a crosslinked elastomeric article. The method comprises (a) forming an elastomeric composition comprising at least one propylene-based polymer and at least one component selected from hindered phenols, phosphites, and hindered amines, (b) adding at least one co-agent selected from multifunctional acrylates, multifunctional methacrylates, functionalized polybutadiene resins, functionalized cyanurate, and allyl isocyanurate; (c) extruding the resulting elastomeric composition with an extruder; and (d) crosslinking the extruded elastomeric composition using electron beam radiation having an e-beam dose of about 200 kGy or less, wherein the co-agent is added to the extruder downstream of the elastomeric composition.

However, it has been found that when the liquid co-agent, such as a multifunctional acrylate, is injected into the extruder using a continuous feeder that utilizes a conventional positive displacement centrifugal or gear pump, such as those feeders available from Zenith, gels may be formed on the shaft of the pump, which may lead to seizing of the shaft or even breaking of the shaft. This can lead to a failure to continuously and consistently feed the co-agent to the extruder, which can lead to forming elastomeric compositions that have inconsistent properties. Not intending to be bound by theory, it is believed that the gel formation occurs because the high shear within the operation of the pump induces self-polymerization of the co-agent on the shaft. As the co-agent has an adhesive nature to metals, as gels are formed they bond to the shaft which leads to the shaft bonding to the pump body, resulting in reduced clearance between the shaft and the pump body.

Therefore, there is a need for an improved method of making such elastomeric compositions, and improved methods for making an article comprising such composition.

SUMMARY OF THE INVENTION

Provided herein is a method of forming a composition, comprising: introducing to an extruder a propylene-based polymer containing from 5 wt % to 40 wt % of ethylene and/or $C_4$-$C_{20}$ α-olefins derived units and having a heat of fusion, as determined by DSC, of from 0.5 J/g to 80 J/g; introducing to the extruder a co-agent selected from multifunctional acrylates, multifunctional methacrylates, functionalized polybutadiene resins, functionalized cyanurate, allyl isocyanurate, and combinations thereof, wherein the co-agent is introduced at a position within the extruder where the temperature is from 23° C. to 125° C.; and forming the composition.

In one or more embodiments, the co-agent may be added using a progressive cavity pump, a diaphragm pump, or a peristaltic pump. Preferably, the pump is operated at a shear rate of less than 100 sec$^{-1}$. In the same or other preferred embodiments, the composition further comprises an antioxidant selected from hindered phenols, phosphites, hindered amines, and combinations thereof.

Also provided herein is a method of forming a film, a nonwoven, or a molded article, the method comprising: (a) introducing to an extruder (i) a propylene-based polymer containing from 5 wt % to 40 wt % of ethylene and/or $C_4$-$C_{20}$ α-olefins derived units and having a heat of fusion, as determined by DSC, of from 0.5 J/g to 80 J/g; (ii) an antioxidant selected from hindered phenols, phosphites, hindered amines, and combinations thereof; and (iii) a co-agent selected from multifunctional acrylates, multifunctional methacrylates, functionalized polybutadiene resins, functionalized cyanurate, allyl isocyanurate and combinations thereof; where the co-agent is introduced at a position within the extruder where the temperature is from 23° C. to 125° C.; (b) forming and extruding a composition comprising the propylene-based polymer, the antioxidant, and the co-agent; and (c) forming the film, nonwoven, or molded article comprising the composition.

DETAILED DESCRIPTION OF THE INVENTION

A detailed description will now be provided. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Described herein are compositions that comprise a propylene-based polymer, a co-agent, and other optional components such as antioxidants, secondary elastomeric components, polyolefinic thermoplastic resins, additives, and fillers. The compositions may be formed by melt-mixing the composition components in a compounder or extruder to form a composition where the co-agent is introduced at a position within the compounder or extruder where the temperature is from 23° C. to 125° C. The co-agent may be introduced to the compounder or extruder using a low shear positive displacement pump.

Propylene-Based Polymer

The "propylene-based polymer" as used herein may be any polymer comprising propylene and other comonomers. The term "polymer" refers to any carbon-containing compound having repeat units from one or more different monomers. Preferably the propylene-based polymer comprises propylene-derived units, α-olefin-derived units and, optionally, diene-derived units. For example, the propylene-based polymer may be a propylene-α-olefin polymer, propylene-α-olefin-diene terpolymer, or propylene-diene copolymer. The propylene-based polymer may be prepared by polymerizing propylene with at least one of ethylene and $C_4$-$C_{20}$ α-olefins, and, optionally, one or more dienes.

The comonomers may be linear or branched. Preferred linear comonomers include ethylene or $C_4$ to $C_8$ α-olefins, more preferably ethylene, 1-butene, 1-hexene, and 1-octene, even more preferably ethylene or 1-butene. Preferred branched comonomers include 4-methyl-1-pentene, 3-methyl-1-pentene, and 3,5,5-trimethyl-1-hexene. In one or more embodiments, the comonomers may include styrene.

The dienes may be conjugated or non-conjugated. Preferably, the dienes are non-conjugated. Illustrative dienes may include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD); and combinations thereof. Preferably, the diene is ENB or VNB.

Preferred methods and catalysts for producing the propylene-based polymers are found in U.S. Patent Application Publication No. 2004/0236042, PCT Publication WO 05/049672, and U.S. Pat. No. 6,881,800. Pyridine amine complexes, such as those described in PCT Publication WO 03/040201 are also useful to produce the propylene-based polymers useful herein. The catalyst may comprise a fluxional complex, which undergoes periodic intra-molecular rearrangement so as to provide the desired interruption of stereoregularity as described in U.S. Pat. No. 6,559,262. The catalyst may be a stereorigid complex with mixed influence on propylene insertion, as described in EP 1070087. The catalyst described in EP 1614699 may also be used for the production of backbones suitable for the polymers described herein.

The propylene-based polymer may have a propylene amount of from 60 wt % to 95 wt %, or from 65 wt % to 95 wt %, or from 70 wt % to 95 wt %, or from 75 wt % to 95 wt %, or from 80 wt % to 95 wt %, or from 83 wt % to 95 wt %, or from 84 wt % to 95 wt %, or from 84 wt % to 94 wt %, based on the weight of the polymer. The balance of the propylene-based polymer comprises at least one of ethylene and $C_4$-$C_{20}$ α-olefin and, optionally, one or more dienes. The α-olefin may be ethylene, butene, hexane, or octene. When two or more α-olefins are present in the polymer, ethylene and at least one of butene, hexane, or octene are preferred.

Preferably, the propylene-based polymer comprises from 5 to 40 wt % of $C_2$ and/or $C_4$-$C_{20}$ α-olefins based the weight of the propylene-based polymer. When two or more of ethylene and $C_4$-$C_{20}$ α-olefins are present the combined amounts of these olefins in the polymer is preferably at least 5 wt % and falling within the ranges described herein. Other preferred ranges of the amount of ethylene and/or one or more α-olefins include from 5 wt % to 35 wt %, or from 5 wt % to 30 wt %, or from 5 wt % to 25 wt %, or from 5 wt % to 20 wt %, or from 5 to 17 wt %, or from 5 wt % to 16 wt %, or from 6 wt % to 16 wt %, based on the weight of the propylene-based polymer.

Preferably, the propylene-based polymer comprises a diene content of from 0.2 wt % to 24 wt % based on the weight of the polymer, or from 0.5 wt % to 12 wt %, or 0.6 wt % to 8 wt %, or from 0.7 wt % to 5 wt %. Other preferred ranges may include from 0.2 wt % to 10 wt %, or from 0.2 wt % to 5 wt %, or from 0.2 wt % to 4 wt %, or from 0.2 wt % to 3.5 wt %, or from 0.2 wt % to 3.0 wt %, or from 0.2 wt % to 2.5 wt % based on the weight of the polymer. In one or more embodiments, the propylene-based polymer may comprise 5-ethylidene-2-norbornene in an amount of from 0.5 wt % to 10 wt %, or from 0.5 wt % to 4 wt %, or from 0.5 wt % to 2.5 wt %, or from 0.5 wt % to 2.0 wt %.

The propylene-based polymer may have a weight average molecular weight (Mw) of 5,000,000 or less, a number average molecular weight (Mn) of 3,000,000 or less, a z-average molecular weight (Mz) of 10,000,000 or less, and a g' index of 0.95 or greater measured at the weight average molecular weight (Mw) of the polymer using isotactic polypropylene as the baseline, all of which may be determined by size exclusion chromatography, e.g., 3D SEC, also referred to as GPC-3D.

The propylene-based polymer may have an Mw of from 5,000 to 5,000,000 g/mole, or from 10,000 to 1,000,000 g/mole, or from 20,000 to 500,000 g/mole, or from 50,000 to 400,000 g/mole. The propylene-based polymer may have an Mn of 2,500 to 2,500,000 g/mole, or from 5,000 to 500,000 g/mole, or from 10,000 to 250,000 g/mole, or from 25,000 to 200,000 g/mole. The propylene-based polymer may have an Mz of 10,000 to 7,000,000 g/mole, or from 50,000 to 1,000,000 g/mole, or from 80,000 to 700,000 g/mole, or from 100,000 to 500,000 g/mole.

The molecular weight distribution index (MWD=(Mw/Mn)), sometimes referred to as a "polydispersity index" (PDI), of the propylene-based polymer may be from 1.5 to 40. For example, the propylene-based polymer may have an MWD with an upper limit of 40, or 20, or 10, or 5, or 4.5, or 3, and a lower limit of 1.5, or 1.8, or 2.0. In one or more embodiments, the MWD of the propylene-based polymer is 1.8 to 5, or from 1.8 to 3. Techniques for determining the molecular weight (Mn and Mw) and molecular weight distribution (MWD) may be found in U.S. Pat. No. 4,540,753 and references cited therein, in Ver Strate et al., "*Near Monodisperse Ethylene-Propylene Copolymers by Direct Ziegler-Natta Polymerization. Preparation, Characterization, Properties,*" MACROMOLECULES, 1988, Volume 21, pp. 3360-3371, and references cited therein, and in accordance with the procedures described in U.S. Pat. No. 6,525,157 at Column 5, Lines 1-44.

The propylene-based polymer may have a g' index value of 0.95 or greater, or at least 0.98, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the propylene-based polymer and $\eta_l$ is the intrinsic viscosity of a linear polymer of the same viscosity-averaged molecular weight ($M_v$) as the propylene-based polymer. Thus, $\eta_l = KM_v^\alpha$, where K and $\alpha$ are measured values for linear polymers and should be obtained on the same instrument as the one used for the g' index measurement.

The propylene-based polymer may have a density of from 0.85 g/cm$^3$ to 0.92 g/cm$^3$, or from 0.87 g/cm$^3$ to 0.90 g/cm$^3$, or from 0.88 g/cm$^3$ to 0.89 g/cm$^3$, at room temperature as measured per the ASTM D-1505 test method.

The propylene-based polymer may have a melt flow rate (MFR, 2.16 kg weight @ 230° C.), equal to or greater than 0.2 g/10 min as measured according to the ASTM D-1238. Preferably, the MFR (2.16 kg @ 230° C.) is from 0.5 g/10 min to 200 g/10 min, or from 1 g/10 min to 100 g/10 min, or from 2 g/10 min to 30 g/10 min, or from 5 g/10 min to 30 g/10 min, or from 10 g/10 min to 30 g/10 min, or from 10 g/10 min to 25 g/10 min.

The propylene-based polymer may have a Mooney viscosity ML (1+4)@125° C., as determined according to ASTM D1646, of less than 100, or less than 75, or less than 60, or less than 30.

The propylene-based polymer may have a heat of fusion ($H_f$) determined by the DSC procedure described herein, which is greater than or equal to 0.5 Joules per gram (J/g), and is equal to or less than 80 J/g, or equal to or less than 75 J/g, or equal to or less than 70 J/g, or equal to or less than 60 J/g, or equal to or less than 50 J/g, or equal to or less than 35 J/g. Also preferably, the propylene-based polymer may have a heat of fusion that is greater than or equal to 1 J/g, or greater than or equal to 5 J/g. Preferred propylene-based polymers may have a heat of fusion ranging from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 50 J/g, or 60 J/g or 70 J/g, or 75 J/g, or 80 J/g.

The crystallinity of the propylene-based polymer may be expressed in terms of percentage of crystallinity (i.e., % crystallinity), as determined according to the DSC procedure described herein. The propylene-based polymer may have a % crystallinity of from 0.5% to 40%, or from 1% to 30%, or from 5% to 25%. In one or more embodiments, the propylene-based polymer may have crystallinity of less than 40%, or from 0.25% to 25%, or from 0.5% to 22%, or from 0.5% to 20%.

The propylene-based polymer preferably may have a single broad melting transition. However, the propylene-based polymer may show secondary melting peaks adjacent to the principal peak, but for purposes herein, such secondary melting peaks are considered together as a single melting point, with the highest of these peaks (relative to baseline as described herein) being considered as the melting point of the propylene-based polymer.

The propylene-based polymer may have a melting point, as measured by the DSC procedure described herein, of equal to or less than 100° C., or less than 90° C., or less than 80° C., or less than or equal to 75° C. In one or more embodiments, the propylene-based polymer may have a melting point of from 25° C. to 80° C., or from 25° C. to 75° C., or from 30° C. to 65° C.

The Differential Scanning calorimetry (DSC) procedure may be used to determine heat of fusion and melting temperature of the propylene-based polymer. The method is as follows: 0.5 grams of polymer is weighed out and pressed to a thickness of 15-20 mils (381-508 microns) at 140° C.-150° C., using a "DSC mold" and Mylar as a backing sheet. The pressed pad is allowed to cool to ambient temperature by hanging in air (the Mylar is not removed). The pressed pad is annealed at room temperature (23-25° C.) for 8 days. At the end of this period, a 15-20 mg disc is removed from the pressed pad using a punch die and is placed in a 10 microliter aluminum sample pan. The sample is placed in a Differential Scanning Calorimeter (Perkin Elmer Pyris 1 Thermal Analysis System) and is cooled to −100° C. The sample is heated at 10° C./min to attain a final temperature of 165° C. The thermal output, recorded as the area under the melting peak of the sample, is a measure of the heat of fusion and may be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The propylene-based polymer may have a triad tacticity of three propylene units, as measured by $^{13}$C NMR of 75% or greater, or 80% or greater, or 82% or greater, or 85% or greater, or 90% or greater. Other preferred ranges may include from 75% to 99%, or from 80% to 99%, or from 85% to 99%. Triad tacticity is determined by the methods described in U.S. Patent Application Publication No. 2004/0236042.

The propylene-based polymer may be a blend of discrete random propylene-based polymers so long as the polymer blend has the properties of the propylene-based polymer as described herein. The number of propylene-based polymers may be three or less, or two or less. In one or more embodiments, the propylene-based polymer may include a blend of two propylene-based polymers differing in the olefin content, the diene content, or the both. Preparation of such polymer blend may be found in U.S. Patent Application Publication Nos. 2004/0024146 and 2006/0183861.

The propylene-based polymers may include copolymers prepared according the procedures described in PCT Publication WO 02/36651. Likewise, the propylene-based polymer may include polymers consistent with those described in PCT Publications WO 03/040201, WO 03/040202, WO 03/040095, WO 03/040201, WO 03/040233, and/or WO 03/040442. Additionally, the propylene-based polymer may include polymers consistent with those described in EP 1 233 191, and U.S. Pat. No. 6,525,157, along with suitable propylene homo- and copolymers described in U.S. Pat. No. 6,770, 713 and U.S. Patent Application Publication No. 2005/215964. The propylene-based polymer may also include one or more polymers consistent with those described in EP 1 614 699 or EP 1 017 729.

The composition may include the propylene-based polymer in an amount of from 40 wt % to 99 wt % based on the weight of the composition. Preferably, the composition includes the propylene-based polymer in an amount of from a low of 40 wt %, or 50 wt %, or 60 wt %, or 70 wt %, or 75 wt %, to an upper limit of 70 wt %, or 80 wt %, or 85 wt %, or 90 wt %, or 95 wt %, based on the weight of the composition so long as the low value is less than the high value.

Grafted (Functionalized) Backbone

In one or more embodiments, the propylene-based polymer may be grafted (i.e., "functionalized") using one or more grafting monomers. As used herein, the term "grafting" denotes covalent bonding of the grafting monomer to a polymer chain of the propylene-based polymer.

The grafting monomer may be or include at least one ethylenically unsaturated carboxylic acid or acid derivative, such as an acid anhydride, ester, salt, amide, imide, acrylates or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo (2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer.

In one or more embodiments, the grafted propylene-based polymer may comprise from 0.5 wt % to 10 wt % ethylenically unsaturated carboxylic acid or acid derivative, or from 0.5 to 6 wt %, or from 0.5 wt % to 3 wt %; in other embodiments from 1 wt % to 6 wt %, or from 1 wt % to 3 wt %.

Styrene and derivatives thereof, such as paramethyl styrene, or other higher alkyl substituted styrenes, such as t-butyl styrene, may be used as a charge transfer agent in presence of the grafting monomer to inhibit chain scissioning. This allows further minimization of the beta scission reaction and the production of a higher molecular weight grafted polymer (MFR=1.5).

Preparing Grafted Propylene-Based Polymers

The grafted propylene-based polymer may be prepared using conventional techniques. For example, the graft polymer may be prepared in solution, in a fluidized bed reactor, or by melt grafting. A preferred grafted polymer may be prepared by melt blending in a shear-imparting reactor, such as an extruder reactor. Single screw but preferably twin screw extruder reactors, such as co-rotating intermeshing extruder or counter-rotating non-intermeshing extruders, but also co-kneaders, such as those sold by Buss, are especially preferred.

The grafted polymer may be prepared by melt blending the ungrafted propylene-based polymer with a free radical generating catalyst, such as a peroxide initiator, in the presence of the grafting monomer. The preferred sequence for the grafting reaction includes melting the propylene-based polymer, adding and dispersing the grafting monomer, introducing the peroxide and venting the unreacted monomer and by-products resulting from the peroxide decomposition. Other sequences may include feeding the monomers and the peroxide pre-dissolved in a solvent.

Illustrative peroxide initiators include, but are not limited to: diacyl peroxides, such as benzoyl peroxide; peroxyesters, such as tert-butylperoxy benzoate, tert-butylperoxy acetate, and OO-tert-butyl-O-(2-ethylhexyl)monoperoxy carbonate; peroxyketals, such as n-butyl-4,4-di-(tert-butylperoxy) valerate; and dialkyl peroxides, such as 1,1-bis(tertbutylperoxy) cyclohexane, 1,1-bis(tert-butylperoxy)-3,3,5-trimethylcyclohexane, 2,2-bis(tert-butylperoxy)butane, dicumylperoxide, tert-butylcumylperoxide, di-(2-tert-butylperoxy-isopropyl-(2))benzene, di-tert-butylperoxide (DTBP), 2,5-dimethyl-2,5-di(tert-butylperoxy)hexane, 2,5-dimethyl-2,5-di(tert-butylperoxy)hexyne, and 3,3,5,7,7-pentamethyl 1,2,4-trioxepane; and the like.

Co-Agents

The composition may include one or more co-agents. Suitable co-agents may include liquid and metallic multifunctional acrylates and methacrylates, functionalized polybutadiene resins, functionalized cyanurate, and allyl isocyanurate. In one or more embodiments, the co-agent may be multifunctional acrylates or methacrylates. Suitable co-agents may include, but are not limited to, polyfunctional vinyl or allyl compounds, for example, triallyl cyanurate, triallyl isocyanurate, pentaerythritol tetramethacrylate, ethylene glycol dimethacrylate, diallyl maleate, dipropargyl maleate, dipropargyl monoallyl cyanurate, azobisisobutyronitrile, and combinations thereof. Commercially available co-agents may be purchased from Sartomer Company, Inc., Exton, Pa., U.S.

The composition may comprise at least 0.1 wt % of co-agent based on the weight of the composition. The amount of co-agent(s) may range from a low of 0.1 wt %, or 0.5 wt %, or 1 wt %, or 1.5 wt %, or 2 wt %, or 2.5 wt %, or 3.0 wt %, to a high of 4.0 wt %, or 5 wt %, or 6 wt %, or 7.0 wt %, or 9 wt %, or 12 wt %, or 15 wt %, based on the weight of the composition. In some embodiments, the amount of co-agent(s) is about 3 wt %, or about 4 wt %, or about 5 wt %, based on the weight of the composition.

Antioxidants

The composition may include one or more anti-oxidants. Suitable anti-oxidants may include hindered phenols, phosphites, hindered amines, or combinations thereof. Suitable commercially available antioxidants may include Irgafos 168, Irganox 1010, Irganox 3790, Irganox B225, Irganox 1035, Irgafos 126, Irgastab 410, Chimassorb 944, made by Ciba Specialty Chemicals Corporation. These antioxidants may be added to the composition to protect against degradation during shaping or fabrication operations and/or to better control the extent of chain degradation.

The composition may comprise at least 0.1 wt % of antioxidant, or from 0.1 wt % to 5 wt % antioxidant, based on the weight of the composition. The amount of antioxidant(s) may range from a low of 0.1 wt %, 0.2 wt %, or 0.3 wt %, or 0.4 wt %, or 0.5 wt %, to a high of 5 wt %, or 4 wt %, or 3 wt %, or 2.5 wt %, or 2 wt %, or 1 wt %, based on the weight of the composition. In some embodiments, the amount of antioxidant(s) is about 0.1 wt %, or about 0.2 wt %, or about 0.3 wt %, or about 0.4 wt %, or about 0.5 wt %, based on the weight of the composition.

Polyolefinic Thermoplastic Resin

The composition may include a polyolefinic thermoplastic resin. The term "polyolefinic thermoplastic resin" as used herein may refer to any material that is not a "rubber" and that is a polymer or polymer blend having a melting point of 70° C. or more and considered by persons skilled in the art as being thermoplastic in nature, e.g., a polymer that softens when exposed to heat and returns to its original condition when cooled to room temperature. The polyolefinic thermoplastic resin may contain one or more polyolefins, including polyolefin homopolymers and polyolefin copolymers. Except as stated otherwise, the term "copolymer" means a polymer derived from two or more monomers (including terpolymers, tetrapolymers, etc.).

Illustrative polyolefins may be prepared from mono-olefin monomers including, but not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, and mixtures thereof, and copolymers thereof with (meth)acrylates and/or vinyl acetates. Preferably, the polyolefinic thermoplastic resin component is unvulcanized or non crosslinked.

In one or more embodiments, the polyolefinic thermoplastic resin contains polypropylene. The term "polypropylene" as used herein broadly means any polymer that is considered a "polypropylene" by persons skilled in the art, and includes homo, impact, and random polymers of propylene. Preferably, the polypropylene used in the compositions described herein may have a melting point above 110° C., includes at least 90 wt % propylene units, and may contain isotactic sequences of those units. The polypropylene may also include atactic sequences or syndiotactic sequences, or the both. The polypropylene may either derive exclusively from propylene monomers (i.e., having only propylene units) or derive from mainly propylene (more than 80% propylene) with the remainder derived from olefins, such as ethylene, and/or $C_4$-$C_{10}$ α-olefins. In one or more embodiments, the polypropylene may have a high MFR of from a low of 10 g/10 min, or 15 g/10 min, or 20 g/10 min, to a high of 25 g/10 min, or 30 g/10 min. In one or more embodiments, the polypropylene may have a lower MFR, of less than 1.0. Those with high MFR may be preferred for ease of processing or compounding.

In one or more embodiments, the polyolefinic thermoplastic resin is or includes isotactic polypropylene. Preferably, the polyolefinic thermoplastic resin contains one or more crystalline propylene homopolymers or copolymers of propylene having a melting temperature greater than 105° C. as measured by DSC. Preferred copolymers of propylene include, but are not limited to, terpolymers of propylene, impact copolymers of propylene, random polypropylene, and mixtures thereof. Preferred comonomers may have 2 carbon atoms, or from 4 to 12 carbon atoms. Preferably, the comonomer is ethylene. Such polyolefinic thermoplastic resin and methods for making the same are described in U.S. Pat. No. 6,342,565.

The term "random polypropylene" as used herein broadly means a copolymer of propylene having up to 9 wt %, or from 2 wt % to 8 wt % of α-olefin comonomer. The random polypropylene may have a 1% secant modulus of from 100 kPsi to 200 kPsi, or from 140 kPsi to 170 kPsi, or from 140 kPsi to 160 kPsi, as measured according to ASTM D790A. In one or more embodiments, the 1% secant modulus of the random polypropylene may range from a low of 100 kPsi, or 110 kPsi, or 125 kPsi, to a high of 145 kPsi, or 160 kPsi, or 175 kPsi.

The random polypropylene may have a density of 0.85 g/cm$^3$ to 0.95 g/cm$^3$, or 0.89 g/cm$^3$ to 0.92 g/cm$^3$, as measured by ASTM D792. In one or more embodiments, the density of the random polypropylene may range from a low of 0.85 g/cm$^3$, 0.87 g/cm$^3$, or 0.89 g/cm$^3$, to a high of 0.90 g/cm$^3$, 0.91 g/cm$^3$, or 0.92 g/cm$^3$.

The composition may include the polyolefinic thermoplastic resin in an amount of less than 50 wt % based on the weight of the composition. For example, the composition may include one or more polyolefinic thermoplastic resins in an amount ranging from a low of 5 wt %, or 10 wt %, or 15 wt %, or 20 wt %, to a high of 25 wt %, or 30 wt %, or 50 wt % based on the weight of the composition.

Secondary Elastomeric Component

The composition may include a secondary elastomeric component. In at least one specific embodiment, the secondary elastomeric component may be or include one or more ethylene-propylene copolymers (EP). Preferably, the ethylene-propylene polymer (EP) is non-crystalline, e.g., atactic or amorphous, but in certain embodiments the EP may be crystalline (including "semi-crystalline"). The crystallinity of the EP may preferably be derived from the ethylene, and a number of published methods, procedures, and techniques are available for evaluating whether the crystallinity of a particular material is derived from ethylene. The crystallinity of the EP may be distinguished from the crystallinity of the propylene-based polymer by removing the EP from the composition and then measuring the crystallinity of the residual propylene-based polymer. Such crystallinity measured is usually calibrated using the crystallinity of polyethylene and related to the comonomer content. The percent crystallinity in such cases is measured as a percentage of polyethylene crystallinity and thus, the origin of the crystallinity from ethylene is established.

In one or more embodiments, the EP may include one or more optional polyenes, including particularly a diene; thus, the EP may be an ethylene-propylene-diene (commonly called "EPDM"). The optional polyene is considered to be any hydrocarbon structure having at least two unsaturated bonds wherein at least one of the unsaturated bonds is readily incorporated into a polymer. The second bond may partially take part in polymerization to form long chain branches but preferably provides at least some unsaturated bonds suitable for subsequent curing or vulcanization in post polymerization processes. Examples of suitable commercially available EP or EPDM copolymers include V722, V3708P, MDV 91-9, and V878, that are available under the trade name Vistalon from ExxonMobil Chemicals. Several commercial EPDM are available from DOW under the trade Nordel IP and MG grades. Certain rubber components include additive oil that is preblended before the rubber component is combined with the thermoplastic. The type of additive oil utilized will be that customarily used in conjunction with a particular rubber component.

Examples of the optional polyene include, but are not limited to, butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Mw) of less than 1000 g/mol. Examples of straight chain acyclic dienes include, but are not limited to, 1,4-hexadiene and 1,6-octadiene. Examples of branched chain acyclic dienes include, but are not limited to, 5-methyl-1,4-hexadiene, 3,7-dimethyl-1,6-octadiene, and 3,7-dimethyl-1,7-octadiene. Examples of single ring alicyclic dienes include, but are not limited to, 1,4-cyclohexadiene, 1,5-cyclooctadiene, and 1,7-cyclododecadiene. Examples of multi-ring alicyclic fused and bridged ring dienes include, but are not limited to, tetrahydroindene; norbornadiene; methyltetrahydroindene; dicyclopentadiene; bicyclo(2.2.1)hepta-2,5-diene; and alkenyl-, alkylidene-, cycloalkenyl-, and cylcoalkyliene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to, vinyl cyclohexene, allyl cyclohexene, vinylcyclooctene, 4-vinylcyclohexene, allyl cyclodecene, vinylcyclododecene, and tetracyclododecadiene.

In another embodiment, the secondary elastomeric component may include, but is not limited to, styrene/butadiene rubber (SBR), styrene/isoprene rubber (SIR), styrene/isoprene/butadiene rubber (SIBR), styrene-butadiene-styrene block copolymer (SBS), hydrogenated styrene-butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene block copolymer (SEP), hydrogenated styrene-isoprene-styrene block copolymer (SEPS), styrene-ethylene/butylene-ethylene block copolymer (SEBE), styrene-ethylene-styrene block copolymer (SES), ethylene-ethylene/butylene block copolymer (EEB), ethylene-ethylene/butylene/styrene block copolymer (hydrogenated BR-SBR block copolymer), styrene-ethylene/butylene-ethylene block copolymer (SEBE), ethylene-ethylene/butylene-ethylene block copolymer (EEBE), polyisoprene rubber, polybutadiene rubber, isoprene butadiene rubber (IBR), polysulfide, nitrile rubber, propylene oxide polymers, star-branched butyl rubber, halogenated star-branched butyl rubber, brominated butyl rubber, chlorinated butyl rubber, star-branched polyisobutylene rubber, star-branched brominated butyl (polyisobutylene/isoprene copolymer) rubber, and poly(isobutylene-co-alkylstyrene), and mixtures thereof. Preferred poly(isobutylene-co-alkylstyrene) include isobutylene/methylstyrene copolymers such as isobutylene/meta-bromomethylstyrene, isobutylene/bromomethylstyrene, isobutylene/chloromethylstyrene, halogenated isobutylene cyclopentadiene, isobutylene/chloromethylstyrene, and mixtures thereof. Preferred secondary elastomeric components include hydrogenated styrene-butadiene-styrene block copolymer (SEBS), and hydrogenated styrene-isoprene-styrene block copolymer (SEPS).

The secondary elastomeric component may also be or include natural rubber. Natural rubbers are described in detail by A. Subramaniam, "*Natural Rubber,*" in RUBBER TECHNOLOGY, 3$^{rd}$ Edition, pp. 179-208 (Maurice Morton, Ed., Chapman & Hall, London, 1995). Suitable natural rubbers may be selected from the group consisting of Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, or from 40 to 65, as measured in accordance with ASTM D-1646.

The secondary elastomeric component may also be or include one or more synthetic rubbers. Suitable commercially available synthetic rubbers include NATSYN™ (Goodyear Chemical Company) and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of a high cis-polybutadiene commercial product useful in the composition is BUDENE™ 1207.

The secondary elastomeric component may be present in an amount of up to 50 wt %, based on the weight of the composition. In one or more embodiments, the amount of the secondary rubber component may range from a low of 1 wt %, or 5 wt %, or 10 wt %, or 15 wt %, or 20 wt %, to a high of 25 wt %, or 30 wt %, or 35 wt %, or 40 wt %, or 50 wt %, based on the weight of the composition.

Additive Oil

The composition may include one or more additive oils. The term "additive oil" includes both "process oils" and "extender oils." For example, "additive oil" may include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include mineral oil, α-olefinic synthetic oils, such as liquid polybutylene, e.g., products sold under the trademark Parapol™. Additive oils other than petroleum based oils may also be used, such as oils derived from coal tar and pine tar, as well as synthetic oils, e.g., polyolefin materials (e.g., Specta-Syn™ and Elevast™, both supplied by ExxonMobil Chemical Company).

One of ordinary skill in the art will recognize which type of oil should be used with a particular rubber, and also be able to determine the amount (quantity) of oil. The additive oil may be present in amounts from 5 to 300 parts by weight per 100 parts by weight of the blend of the rubber and thermoplastic components. The amount of additive oil may also be expressed as from 30 to 250, or from 70 to 200, parts by weight per 100 parts by weight of the rubber component. Alternatively, the quantity of additive oil may be based on the total rubber content, and defined as the ratio, by weight, of additive oil to total rubber and that amount may in certain cases be the combined amount of process oil and extender oil. The ratio may range, for example, from 0 to 4.0:1. Other ranges, having any of the following lower and upper limits, may also be utilized: a lower limit of 0.1:1, or 0.6:1, or 0.8:1, or 1:1, or 1.2:1, or 1.5:1, or 1.8:1, or 2.0:1, or 2.5:1; and an upper limit (which may be combined with any of the foregoing lower limits) of 4:1, or 3.8:1, or 3.5:1, or 3.2:1, or 3:1, or 2.8:1. Larger amounts of additive oil may be used, although the deficit is often reduced physical strength of the composition, oil weeping, or both.

Polybutene oils are preferred. Preferable polybutene oils have an Mn of less than 15,000, and include homopolymer or copolymer of olefin derived units having from 3 to 8 carbon atoms, or from 4 to 6 carbon atoms. In one or more embodiments, the polybutene is a homopolymer or copolymer of a $C_4$ raffinate. Suitable low molecular weight polymers termed "polybutene" polymers are described in, for example, J. D. Fotheringham, "*Polybutenes,*" in SYNTHETIC LUBRICANTS AND HIGH-PERFORMANCE FUNCTIONAL FLUIDS, pp. 357-392 (Leslie R. Rudnick & Ronald L. Shubkin, ed., Marcel Dekker 1999) (hereinafter "polybutene processing oil" or "polybutene").

In one or more embodiments, the polybutene processing oil is a copolymer having at least isobutylene derived units, and optionally 1-butene derived units, and/or 2-butene derived units. In one or more embodiments, the polybutene is a homopolymer if isobutylene, or a copolymer of isobutylene and 1-butene or 2-butene, or a terpolymer of isobutylene and 1-butene and 2-butene, wherein the isobutylene derived units are from 40 wt % to 100 wt % of the copolymer, the 1-butene derived units are from 0 wt % to 40 wt % of the copolymer, and the 2-butene derived units are from 0 to 40 wt % of the copolymer. In one or more embodiments, the polybutene is a copolymer or terpolymer wherein the isobutylene derived units are from 40 wt % to 99 wt % of the copolymer, the 1-butene derived units are from 2 wt % to 40 wt % of the copolymer, and the 2-butene derived units are from 0 wt % to 30 wt % of the copolymer. In one or more embodiments, the polybutene is a terpolymer of the three units, wherein the isobutylene derived units are from 40 wt % to 96 wt % of the copolymer, the 1-butene derived units are from 2 wt % to 40 wt % of the copolymer, and the 2-butene derived units are from 2 wt % to 20 wt % of the copolymer. In one or more embodiments, the polybutene is a homopolymer or copolymer of isobutylene and 1-butene, wherein the isobutylene derived units are from 65 wt % to 100 wt % of the homopolymer or copolymer, and the 1-butene derived units are from 0 wt % to 35 wt % of the copolymer. Commercial examples of suitable processing oils include the PARAPOL™ Series of processing oils, or polybutene grades, or Indopol™ from Soltex Synthetic Oils, and Lubricants or from BP/Innovene.

The processing oil or oils may be present in the composition at from 1 to 60 parts by weight, or from 2 to 40 parts by weight, or from 4 to 35 parts by weight, or from 5 to 30 parts by weight per 100 parts by weight of the propylene-based polymer.

In some embodiments, the composition may be substantially free of oil. By substantially free of oil, it is meant that no processing oil or oils are intentionally added to the composition, and that the composition comprises less than 5 wt % of oil, or less than 2.5 wt % is of oil, or less than 1 wt % of oil, or less than 0.5 wt % of oil, or less than 0.1 wt % of oil.

Methods of Forming the Compositions and Articles

The propylene-based polymer and co-agent may be blended by melt-mixing in a compounder or extruder to form a composition. Optionally, polyolefinic thermoplastic resins, secondary elastomeric components, additive oils, and/or antioxidants may also be blended with the propylene-based polymer and co-agent to form the composition. The composition may be blended in any compounder capable of generating shear and mixing. Exemplary compounders may include, but are not limited to, extruders with kneaders or mixing elements with one or more mixing tips or flights; extruders with one, two, or more screws; extruders of co- or counter-rotating type; Banbury mixers; Farrell continuous mixers; and Buss kneaders. Preferably, the compounder is an extruder, such as a single screw extruder or twin screw extruder.

The type and intensity of mixing, temperature, and residence time required may be achieved by the choice of one of the above compounders in combination with the selection of kneading or mixing elements, for example, screw design and screw speed of an extruder. Screw design and screw speed of an extruder for making the composition may vary depending on the materials being processed and the amount of pre-mixing, if any. Any single or twin screw extruder may be used under some conditions. Preferably, the screw geometry may include good solids conveying coupled with optimized mixing elements to provide good homogenization. Both distributive and dispersive mixing elements may be used to provide uniform output. One example of preferred mixing screw geometry includes a barrier flight screw, often referred to in the art as a "Maillefer" screw. Preferably, the screw speed may be less than 3000 RPM, or less than 1000 RPM, or less than 500 RPM, or less than 300 RPM. A ratio of the length to diameter (L/D) of an extruder may be 10:1 or greater, or 15:1 or greater, or 20:1 or greater, or 25:1 or greater.

The order of the addition of the propylene-base polymer, co-agent, and other optional components may vary. In one or more preferred embodiments, the co-agent may be added to the extruder downstream of the propylene-based polymer and other optional components. For example, the propylene-based polymer and other optional components may be individually added to the extruder and then melt blended in the extruder, followed by the addition of the co-agent to the extruder. In other embodiments, a dry pre-blending of the propylene-based polymer and other optional components may be made, for example, in a tumble blender, double-cone blender, ribbon blender, or other suitable blender, where the propylene-based polymer and other components may be brought into contact without intimate mixing, and then followed by melt blending with the co-agent in an extruder.

Preferably, the co-agent is introduced to the extruder at a position within the extruder where the temperature is maintained below the self-polymerization temperature of the co-agent, for example, less than 130° C., or from 23° C. to 125° C., or from 30° C. to 110° C., or from 40° C. to 110° C., or from 50° C. to 100° C., or from 70° C. to 95° C. This may avoid gel formation by self-polymerization of the co-agent at the position where the co-agent is introduced and accordingly plugging or breaking of the injector, and accordingly, aid in continuity in forming the composition with consistent properties.

Accordingly, provided herein are methods for forming a composition, the method comprising (i) introducing to an extruder a propylene-based polymer containing from 5 wt % to 40 wt % of ethylene and/or $C_4$-$C_{20}$ α-olefins derived units and having a heat of fusion, as determined by DSC, of from 0.5 J/g to 80 J/g; (ii) introducing to the extruder a co-agent selected from multifunctional acrylates, multifunctional methacrylates, functionalized polybutadiene resins, functionalized cyanurate, allyl isocyanurate, and combinations thereof, wherein the co-agent is introduced at a position within the extruder where the temperature is from 23° C. to 125° C.; and (iii) forming the composition.

Preferably, the co-agent is injected at a position of the first 50% length downstream from the position within the extruder where the propylene-based polymer is introduced. Preferably, the propylene-based polymer is introduced from a feed throat located at the starting position of the extruder. Accordingly, in one or more embodiments, the co-agent may be injected at a position of the first 30%, or 20%, or 15%, or 10%, or 8%, or 5%, or 3% length downstream from the feed throat of the extruder. Stated another way, the co-agent is preferably injected/introduced to the extruder at a position that is within 0.5 L downstream of the feed throat of the extruder where the propylene-based polymer is introduced, where L is the total distance from said feed throat to the end of the extruder. Thus, the co-agent may be injected or introduced to the extruder at a distance within 0.50 L, or 0.30 L, or 0.20 L, or 0.15 L, or 0.10 L, or 0.08 L, or 0.05 L, or 0.03 L from the feed throat of the extruder where the propylene-based polymer is introduced.

Not intending to be limited by any theory, it has been found that a progressive cavity pump, a diaphragm pump, or a peristaltic pump is particularly useful to introduce the co-agent to an extruder. Preferably, the progressive cavity pump, the diaphragm pump, or the peristaltic pump is operated under conditions that provide a shear rate of less than 100 sec$^{-1}$, or less than 80 sec$^{-1}$, or less than 60 sec$^{-1}$. Other preferred ranges of the shear rate of the positive displacement pump may be from 1 sec$^{-1}$ to 100 sec$^{-1}$, or from 3 to 80 sec$^{-1}$, or from 5 sec$^{-1}$ to 60 sec$^{-1}$, or from 10 sec$^{-1}$ to 50 sec$^{-1}$. Useful progressive cavity pumps may be those available from Seepex GmbH, Germany, and Moyno Inc., U.S.A. Useful diaphragm pumps may be those available from Dover's Pump Solutions Group, U.S.A. under trade name of Wilden and from Ingersoll-Rand plc, Ireland under the trade name of ARO. Useful peristaltic pumps may be those available from Cole-Parmer under the trade name of MasterFlex and from Watson-Marlow Pumps Group, U.S.A.

In addition to the co-agents, antioxidants, polyolefinic thermoplastic resins and secondary elastomeric components, other additives and fillers may also be included. Depending upon the desired application of the composition, other additives may include, but are not limited to, antiblocking agents, antistatic agents, ultraviolet stabilizers, pigments, coloring agents, nucleating agents, fire or flame retardants, plasticizers, vulcanizing or curative agents, vulcanizing or curative accelerators, tackifiers, flow improvers, lubricants, mold release agents, foaming agents, reinforcing agent, and processing aids. The additives may be added to the blend in pure form or in master batches. Fillers suitable for use in the composition may be those known in the art, such as granular, fibrous, or powder-like fillers. Non-limiting fillers include natural and synthetic clays, carbon black, diatomaceous earth, among others. Other additives and fillers may be introduced at the same time as the other polymeric components or later downstream of the addition of the other polymeric components.

The composition may be further crosslinked by exposure to electromagnetic radiation having a frequency greater than that of visible light, such as for example, near ultraviolet radiation, extreme ultraviolet radiation, soft x-rays, hard x-rays, gamma rays, high-energy gamma rays, and moisture cure with silane compounds. In certain embodiments, the composition may be crosslinked by electron beam radiation, as described in PCT Publication WO 2011/041230 and U.S. Pat. Nos. 8,178,031 and 7,867,433.

The composition may be made or shaped into a wide variety of finished articles by finishing methods well known to those of skill in the art. Such articles may include films, nonwovens, coatings, and molded articles. Accordingly, also provided herein are methods for making a film, a nonwoven, or a molded article, where the method comprises (a) introducing to an extruder (i) a propylene-based polymer containing from 5 wt % to 40 wt % of ethylene and/or $C_4$-$C_{20}$ α-olefins derived units and having a heat of fusion, as determined by DSC, of from 0.5 J/g to 80 J/g; (ii) an antioxidant selected from hindered phenols, phosphites, hindered amines, and combinations thereof; and (iii) a co-agent selected from multifunctional acrylates, multifunctional methacrylates, functionalized polybutadiene resins, functionalized cyanurate, allyl isocyanurate, and combinations thereof; where the co-agent is introduced at a position within the extruder where the temperature is from 23° C. to 125° C.; (b) forming and extruding a composition comprising the propylene-based polymer, the antioxidant, and the co-agent; and (c) forming the film, nonwoven, or molded article comprising the composition. The articles may be formed by any suitable process, such as for example, extrusion, blow molding, injection molding, meltblowing, spunbonding, compression molding, fiber spinning, and other processes known to those familiar with the art.

In one or more embodiments, the method may comprise supplying the composition directly from the extruder to the apparatus for forming the film, nonwoven, or molded article. By supplied directly, it is meant that the composition is supplied to the film, nonwoven, or molded article forming apparatus without first being pelletized. Thus, in one or more embodiments, the composition from the extruder is not pelletized or solidified before being directed to an apparatus for forming films, nonwovens, or molded articles, such as blow molding, injection molding, meltblowing, spunbonding, compression molding, and fiber spinning apparatuses. Thus, the method for forming a film, nonwoven, or molded article may comprise (a) introducing to an extruder (i) a propylene-based polymer containing from 5 wt % to 40 wt % of ethylene and/or $C_4$-$C_{20}$ α-olefins derived units and having a heat of fusion, as determined by DSC, of from 0.5 J/g to 80 J/g; (ii) an antioxidant selected from hindered phenols, phosphites, hindered amines, and combinations thereof; and (iii) a co-agent selected from multifunctional acrylates, multifunctional methacrylates, functionalized polybutadiene resins, functionalized cyanurate, allyl isocyanurate, and combinations thereof; where the co-agent is introduced at a position within the extruder where the temperature is from 23° C. to 125° C.; (b) forming and extruding a composition comprising the propylene-based polymer, the antioxidant, and the co-agent to form an extruded composition; and (c) directly introducing the extruded composition to an apparatus for forming the film, nonwoven, or molded article, where the extruded composition is not pelletized before being introduced to the apparatus for forming the film, nonwoven, or molded article.

The compositions, or the articles of the present invention are particularly useful in applications requiring stretchable elastic materials, such as in disposable diapers, training pants, incontinence pads, clothing, undergarments, sports apparel, automotive trim, weather-stripping, gaskets, and furniture upholstery, among others.

EXAMPLES

The foregoing discussion may be further described with reference to the following non-limiting examples. Compositions containing propylene-based polymers, co-agent, antioxidant, and other components were prepared in Examples 1 to 5. The materials used in the examples are as follows.

VM6102 is a propylene-based polymer having 16 wt % of ethylene-derived units, with the balance being propylene-derived units, and is substantially free of diene-derived units, and is commercially available from ExxonMobil Chemical Company, Texas under the trade name Vistamaxx™ 6102. VM6102 had a heat of fusion of 13 J/g.

PBP1 was a propylene-based polymer prepared using a metallocene catalyst and having 14.8 wt % of ethylene and 1.1 wt % of ENB, with the balance being propylene, a melting temperature of 49° C., an MFR (2.16 kg, 230° C.) of 3.2 g/10 min, and a heat of fusion of 7 J/g.

PBP2 was a propylene-based polymer prepared using a metallocene catalyst and having 14.8 wt % of ethylene and 1.4 wt % of ENB, with the balance being propylene, a melting temperature of 48° C., an MFR (2.16 kg, 230° C.) of 3.5 g/10 min, and a heat of fusion of 7 J/g.

PBP3 was a propylene-based polymer prepared using a metallocene catalyst and having 14.6 wt % of ethylene and 1.7 wt % of ENB, with the balance being propylene, a melting temperature of 57° C., an MFR (2.16 kg, 230° C.) of 3.6 g/10 min, and a heat of fusion of 10 J/g.

PP 5341 was a 0.8 MFR (2.16 kg, 230° C.) isotactic polypropylene (iPP) that is commercially available from ExxonMobil Chemical Company, Texas.

Sartomer SR350 is a trimethylolpropane trimethacrylate co-agent that is commercially available from Sartomer Company, Inc., located in Exton, Pa.

Irgafos 168 is an antioxidant comprising tris(2,4-di-(tert)-butylphenyl) phosphite, and is commercially available from Ciba Specialty Chemicals Corporation.

The following Table 1 shows the formula components of the compositions of Examples 1 to 5.

TABLE 1

| | Composition Formulations in Weight Percent | | | | | | |
|---|---|---|---|---|---|---|---|
| Composition | VM6102 (wt %) | PBP1 (wt %) | PBP2 (wt %) | PBP3 (wt %) | PP 5341 (wt %) | Sartomer 350 (wt %) | Irgafos 168 (wt %) |
| 1 | 96.8 | | | | | 3 | 0.2 |
| 2 | | 96.8 | | | | 3 | 0.2 |

TABLE 1-continued

Composition Formulations in Weight Percent

| Composition | VM6102 (wt %) | PBP1 (wt %) | PBP2 (wt %) | PBP3 (wt %) | PP 5341 (wt %) | Sartomer 350 (wt %) | Irgafos 168 (wt %) |
|---|---|---|---|---|---|---|---|
| 3 | | | 96.8 | | | 3 | 0.2 |
| 4 | | | | 96.8 | | 4 | 0.2 |
| 5 | | | 91.8 | | 5 | 3 | 0.2 |

Examples 1-5

In Examples 1 to 5, the corresponding compositions 1 to 5 as shown in Table 1 was prepared in a co-rotating twin screw extruder available from Coperion Corporation, U.S.A. Mixing conditions included a total feed rate of 100 kg/hr, a screw speed of 200 RPM, a melt temperature of not exceeding 200° C. All formula components except for the co-agent were continuously fed to the twin screw extruder via a feed throat of the extruder for extrusion. The co-agent in each example was injected using a progressive cavity pump from Seepex GmbH, Germany, at an injection position where the temperature was about 90° C., and was located at about 10% length downstream from the feed throat of the extruder.

In Examples 1 to 5, when using the progressive cavity pump to add the co-agent to the extruder, the formulated samples of examples 1 to 5 were successfully produced. Injections of the co-agent at positions where the temperature was about 90° C. did not cause any plugging at the injection positions and the extruder was able to continuously form the composition. It was shown that a progressive cavity pump was capable of continuously pumping the liquid co-agent to the extruder without self-polymerization. It was also shown that injections at positions having a lower temperature within the extruder were preferred to form the compositions with consistent distribution of the co-agent.

Comparative Examples 1 to 2

In Comparative Example 1, the Composition 1 as shown in Table 1 was prepared in the same manner as that in Example 1 except that the co-agent was injected using a positive displacement gear pump under the trade name of Zenith from Colfax Corporation, Monroe, N.C., USA, at an injection position where the temperature within the extruder was about 165° C., and was located at the 63% length downstream from the feed throat of the extruder. The shear rate within the positive displacement gear pump was about 30-40 sec$^{-1}$. In this comparative example, an immediate failure (breakage of the gear pump) was observed. The result showed that a continuous injection of the co-agent using a positive displacement gear pump could not be successfully achieved due to premature self-polymerization of the co-agent under the high shear environment in the pump.

In Comparative Example 2, the Composition 1 shown in Table 1 was prepared in the same manner as that in Comparative Example 1, except that the co-agent was injected using the progressive cavity pump as used in Examples 1 to 5. In this comparative example, plugging at the injection position was observed. The result showed that a continuous injection of the co-agent at a position where the temperature within the extruder was 165° C. could not be successfully achieved due to the self-polymerization of the co-agent within the extruder.

Having described the various aspects of the compositions and methods of making the compositions herein, the invention is further described in various numbered embodiments below.

Embodiment 1. A method of forming a composition, comprising: introducing to an extruder a propylene-based polymer containing from 5 wt % to 40 wt % of ethylene and/or $C_4$-$C_{20}$ α-olefins derived units and having a heat of fusion, as determined by DSC, of from 0.5 J/g to 80 J/g; introducing to the extruder a co-agent selected from multifunctional acrylates, multifunctional methacrylates, functionalized polybutadiene resins, functionalized cyanurate, allyl isocyanurate, and combinations thereof, wherein the co-agent is introduced at a position within the extruder where the temperature is from 23° C. to 125° C.; and forming the composition.

Embodiment 2. The method of Embodiment 1, wherein the co-agent is introduced at a position within the extruder where the temperature is from 50° C. to 100° C.

Embodiment 3. The method of Embodiments 1 or 2, wherein the co-agent is introduced to the extruder using a pump selected from a progressive cavity pump, a diaphragm pump, and a peristaltic pump.

Embodiment 4. The method of any of Embodiments 1 to 3, wherein the pump is operated under an average shear rate of less than 100 sec$^{-1}$.

Embodiment 5. The method of any of Embodiments 1 to 4, wherein the co-agent is introduced to the extruder downstream of where the propylene-based polymer is introduced to the extruder.

Embodiment 6. The method of any of Embodiments 1 to 5, wherein the co-agent is introduced at the first 30% length downstream from a feed throat of the extruder where the propylene-based polymer is introduced.

Embodiment 7. The method of any of Embodiments 1 to 6, wherein the co-agent is introduced at a distance within 0.30 L from the feed throat of the extruder where the propylene-based polymer is introduced to the extruder, wherein L is the distance from said feed throat to the end of the extruder.

Embodiment 8. The method of any of Embodiments 1 to 7, wherein the co-agent is introduced at the first 15% length downstream from a feed throat of the extruder where the propylene-based polymer is introduced.

Embodiment 9. The method of any of Embodiments 1 to 8, wherein the co-agent is introduced at a distance within 0.15 L from the feed throat of the extruder where the propylene-based polymer is introduced to the extruder, wherein L is the distance from said feed throat to the end of the extruder.

Embodiment 10. The method of any of Embodiments 1 to 9, wherein the extruder is a single screw extruder or a twin screw extruder.

Embodiment 11. The method of any of Embodiments 1 to 10, wherein the propylene-based polymer has a melting point of 100° C. or less.

Embodiment 12. The method of any of Embodiments 1 to 11, wherein the propylene-based polymer has a triad tacticity, as determined by $^{13}$C NMR, of from 75% to 99%.

Embodiment 13. The method of any of Embodiments 1 to 12, wherein the propylene-based polymer comprises units derived from at least one of ethylene, butene, hexene, and octene.

Ebodiment 14. The method of any of Embodiments 1 to 13, wherein the propylene-based polymer comprises from 0.2 wt % to 24 wt % of one or more diene derived units based on the weight of the propylene-based polymer.

Ebodiment 15. The method of any of Embodiments 1 to 14, wherein the propylene-based polymer comprises from 0.5 wt % to 10 wt % of 5-ethylidene-2-norbornene based on the weight of the propylene-based polymer.

Ebodiment 16. The method of any of Embodiments 1 to 15, wherein the composition comprises from 0.1 wt % to 15 wt % of the co-agent based on the weight of the composition.

Ebodiment 17. The method of any of Embodiments 1 to 16, wherein the co-agent is a multifunctional methacrylate.

Ebodiment 18. The method any of Embodiments 1 to 17 further comprising introducing to the extruder an antioxidant selected from hindered phenols, phosphites, hindered amines, and combinations thereof.

Ebodiment 19. The method of Embodiment 18, wherein the antioxidant is introduced to the extruder upstream of where the co-agent is introduced.

Ebodiment 20. The method of Embodiments 18 or 19, wherein the composition comprises from 0.1 wt % to 5 wt % of the antioxidant based on the weight of the composition.

Ebodiment 21. The method of any of Embodiments 18 to 20, wherein the antioxidant is a phosphite.

Ebodiment 22. The method of any of Embodiments 1 to 21 further comprising introducing to the extruder at least one of a secondary elastomeric component or a polyolefinic thermoplastic resin.

Ebodiment 23. The method of any of Embodiments 1 to 22 further comprising crosslinking the composition using electron beam radiation having an e-beam dosage of about 200 kGy or less.

Ebodiment 24. A composition made by the method of any of the proceeding Embodiments 1 to 23.

Ebodiment 25. A method of forming a film, a nonwoven, or a molded article, the method comprising: (a) introducing to an extruder (i) a propylene-based polymer containing from 5 wt % to 40 wt % of ethylene and/or $C_4$-$C_{20}$ α-olefins derived units and having a heat of fusion, as determined by DSC, of from 0.5 J/g to 80 J/g; and (ii) an antioxidant selected from hindered phenols, phosphites, hindered amines, and combinations thereof; and (iii) a co-agent selected from the group consisting of multifunctional acrylates, multifunctional methacrylates, functionalized polybutadiene resins, functionalized cyanurate, allyl isocyanurate, and combinations thereof; where the co-agent is introduced at a position within the extruder where the temperature is from 23° C. to 125° C.; (b) forming and extruding a composition comprising the propylene-based polymer, the antioxidant, and the co-agent; and (c) forming the film, nonwoven, or molded article comprising the composition.

Ebodiment 26. The method of Embodiment 25, wherein the composition is not pelletized before being introduced to an apparatus for forming the film, nonwoven, or molded article.

Ebodiment 27. A method of forming a film, a nonwoven, or a molded article, the method comprising: (a) introducing to an extruder (i) a propylene-based polymer containing from 5 wt % to 40 wt % of ethylene and/or $C_4$-$C_{20}$ α-olefins derived units and having a heat of fusion, as determined by DSC, of from 0.5 J/g to 80 J/g; and (ii) an antioxidant selected from hindered phenols, phosphites, hindered amines, and combinations thereof; and (iii) a co-agent selected from the group consisting of multifunctional acrylates, multifunctional methacrylates, functionalized polybutadiene resins, functionalized cyanurate, allyl isocyanurate, and combinations thereof; where the co-agent is introduced at a position within the extruder where the temperature is from 23° C. to 125° C.; (b) forming and extruding a composition comprising the propylene-based polymer, the antioxidant, and the co-agent to form an extruded composition; and (c) directly introducing the extruded composition to an apparatus for forming the film, nonwoven, or molded article, where the extruded composition is not pelletized before being introduced to the apparatus for forming the film, nonwoven, or molded article.

Ebodiment 28. The method of Embodiments 25 to 27, wherein the co-agent is introduced at a position within the extruder where the temperature is from 50° C. to 100° C.

Ebodiment 29. The method of Embodiments 25 to 28, wherein the co-agent is introduced using a pump selected from a progressive cavity pump, a diaphragm pump, and a peristaltic pump.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication, or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method of forming a composition, comprising:
   introducing to an extruder a propylene-based polymer in an amount from 50 wt % to 99 wt % based on the weight of the composition, the propylene-based polymer containing from 5 wt % to 40 wt % of ethylene and/or $C_4$-$C_{20}$ α-olefins derived units and having a heat of fusion, as determined by DSC, of from 0.5 J/g to 80 J/g;
   introducing to the extruder a co-agent selected from multifunctional acrylates, multifunctional methacrylates, functionalized polybutadiene resins, functionalized cyanurate, allyl isocyanurate, and combinations thereof, wherein the co-agent is introduced at a position within the extruder where the temperature is from 23° C. to 125° C; wherein the co-agent is introduced using a pump selected from a progressive cavity pump, a diaphragm pump, and a peristaltic pump; and
   forming the composition in the extruder.

2. The method of claim 1, wherein the co-agent is introduced at a position within the extruder where the temperature is from 50° C. to 100° C.

3. The method of claim 1, wherein the pump is operated at shear rate of less than 100 $sec^{-1}$.

4. The method of claim 1, wherein the co-agent is introduced to the extruder downstream of where the propylene-based polymer is introduced to the extruder.

5. The method of claim 1, wherein the co-agent is introduced at a distance within 0.30 L from the feed throat of the extruder where the propylene-based polymer is introduced to the extruder, wherein L is the distance from said feed throat to the end of the extruder.

6. The method of claim 1, wherein the co-agent is introduced at a distance within 0.15 L from the feed throat of the extruder where the propylene-based polymer is introduced to the extruder, wherein L is the distance from said feed throat to the end of the extruder.

7. The method of claim 1, wherein the extruder is a single screw extruder or a twin screw extruder.

8. The method of claim 1, wherein the propylene-based polymer has a melting point of 100° C. or less.

9. The method of claim 1, wherein the propylene-based polymer has a triad tacticity, as determined by $^{13}$C NMR, of from 75% to 99%.

10. The method of claim 1, wherein the propylene-based polymer comprises units derived from at least one of ethylene, butene, hexene, and octene.

11. The method of claim 1, wherein the propylene-based polymer comprises from 0.2 wt % to 24 wt % of one or more diene derived units based on the weight of the propylene-based polymer.

12. The method of claim 1, wherein the propylene-based polymer comprises from 0.5 wt % to 10 wt % of 5-ethylidene-2-norbornene based on the weight of the propylene-based polymer.

13. The method of claim 1, wherein the composition comprises from 0.1 wt % to 15 wt % of the co-agent based on the weight of the composition.

14. The method of claim 1, wherein the co-agent is a multifunctional methacrylate.

15. The method of claim 1 further comprising introducing to the extruder an antioxidant selected from the group consisting of hindered phenols, phosphites, hindered amines and combinations thereof.

16. The method of claim 15, wherein the antioxidant is introduced to the extruder upstream of where the co-agent is introduced.

17. The method of claim 15, wherein the composition comprises from 0.1 wt % to 5 wt % of the antioxidant based on the weight of the composition.

18. The method of claim 1 further comprising introducing to the extruder at least one of a secondary elastomeric component or a polyolefinic thermoplastic resin.

19. The method of claim 1 further comprising crosslinking the composition using electron beam radiation having an e-beam dosage of about 200 kGy or less.

20. A composition made by the method of claim 1.

21. A method of forming a film, a nonwoven, or a molded article, the method comprising:
(a) introducing to an extruder (i) from 50 wt % to 99 wt %, based on the weight of the composition, of a propylene-based polymer containing from 5 wt% to 40 wt % of ethylene and/or $C_4$-$C_{20}$ α-olefins derived units and having a heat of fusion, as determined by DSC, of from 0.5 J/g to 80 J/g; and (ii) an antioxidant selected from hindered phenols, phosphites, hindered amines, and combinations thereof and (iii) a co-agent selected from multifunctional acrylates, multifunctional methacrylates, functionalized polybutadiene resins, functionalized cyanurate, allyl isocyanurate, and combinations thereof; where the co-agent is introduced at a position within the extruder where the temperature is from 23° C. to 125° C.; wherein the co-agent is introduced using a pump selected from a progressive cavity pump, a diaphragm pump, and a peristaltic pump;
(b) forming and extruding a composition comprising the propylene-based polymer, the antioxidant, and the co-agent; and
(c) forming the film, nonwoven, or molded article comprising the composition.

22. The method of claim 21, wherein the co-agent is introduced at a position within the extruder where the temperature is from 50° C. to 100° C.

23. The method of claim 21, wherein the composition is not pelletized before being introduced to an apparatus for forming the film, nonwoven, or molded article.

* * * * *